United States Patent [19]
Ruckstaetter

[11] 3,857,330
[45] Dec. 31, 1974

[54] APPARATUS AND METHOD FOR MANUFACTURING A TOROID SHAPED HOT DOG

[76] Inventor: George A. Ruckstaetter, 9586 W. Gullway, Richland, Mich.

[22] Filed: Dec. 6, 1973

[21] Appl. No.: 422,558

[52] U.S. Cl. .................. 99/354, 99/355, 99/427, 99/442, 425/127, 425/129, 17/1 F
[51] Int. Cl. .......................... A22c 7/00, A22c 11/04
[58] Field of Search ............ 99/354, 355, 357, 373, 99/374, 377, 378, 381, 382, 383, 427, 442, 450.6; 425/116, 127, 129; 17/1 F

[56] References Cited
UNITED STATES PATENTS
1,663,719  3/1928  Morley ........................... 99/372
3,781,447  12/1973  Durso .......................... 99/354 X

*Primary Examiner*—Peter Feldman
*Assistant Examiner*—Alan Cantor

[57] ABSTRACT

An apparatus for manufacturing a toroid shaped hot dog in the general form of a doughnut including a mold having a series of doughnut designing cavities spaced therein with each cavity adapted to accept a circular flattened casing therein having a compartment defined between the casing wall members, a stuffing apparatus adapted to engage the casing in each mold recess to stuff the casing with a food product filling, a sealing apparatus for sealing the opening in the casing previously utilized by the stuffing apparatus to form a sealed casing about the food product, an oven for the cooking of the food product within the casing, a stripping apparatus adapted to engage each casing individually and sever the casing to permit its removal from the cooked food product, and a package adapted to receive a plurality of the cooked doughnut shaped hot dogs for purposes of shipping and storage.

3 Claims, 17 Drawing Figures

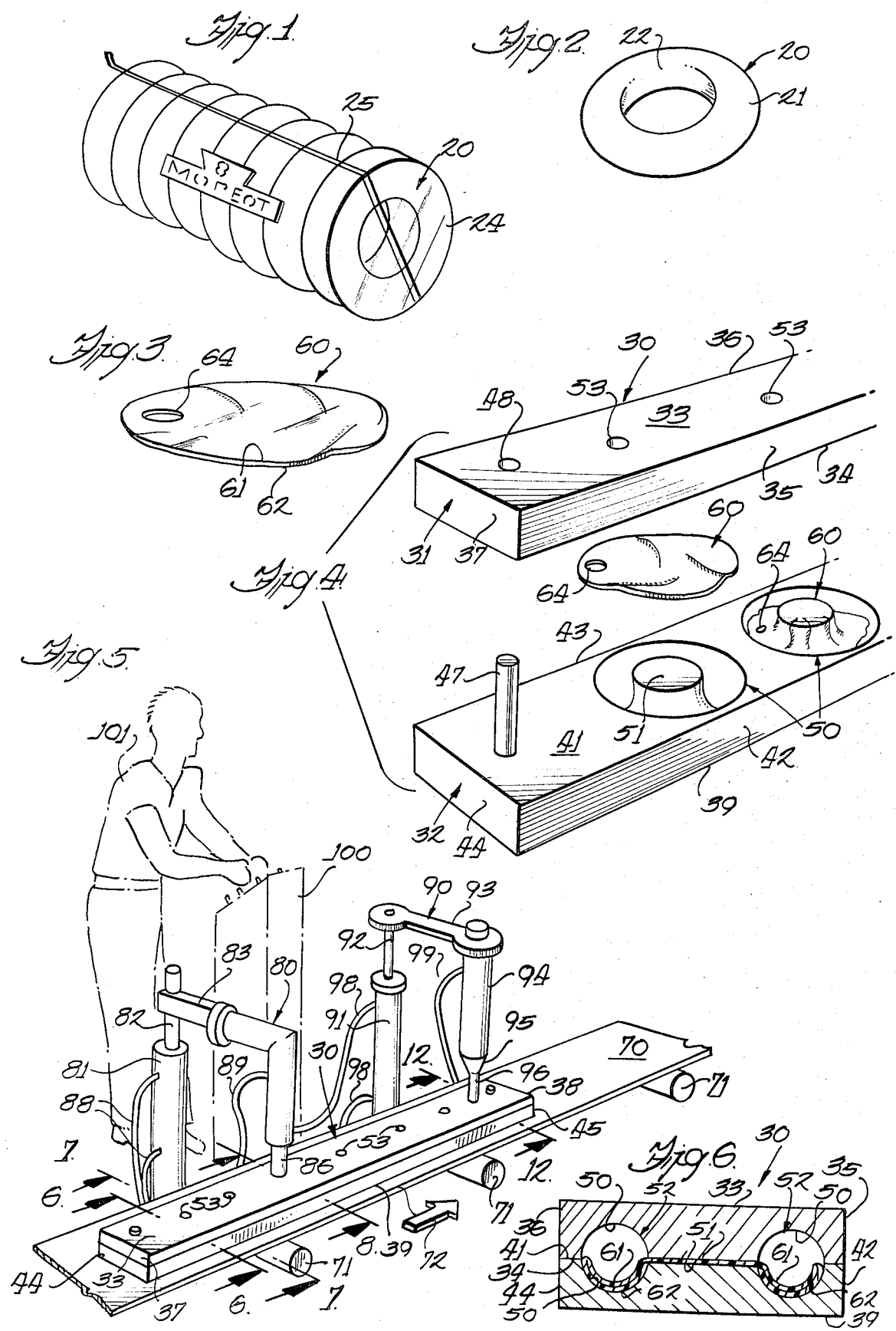

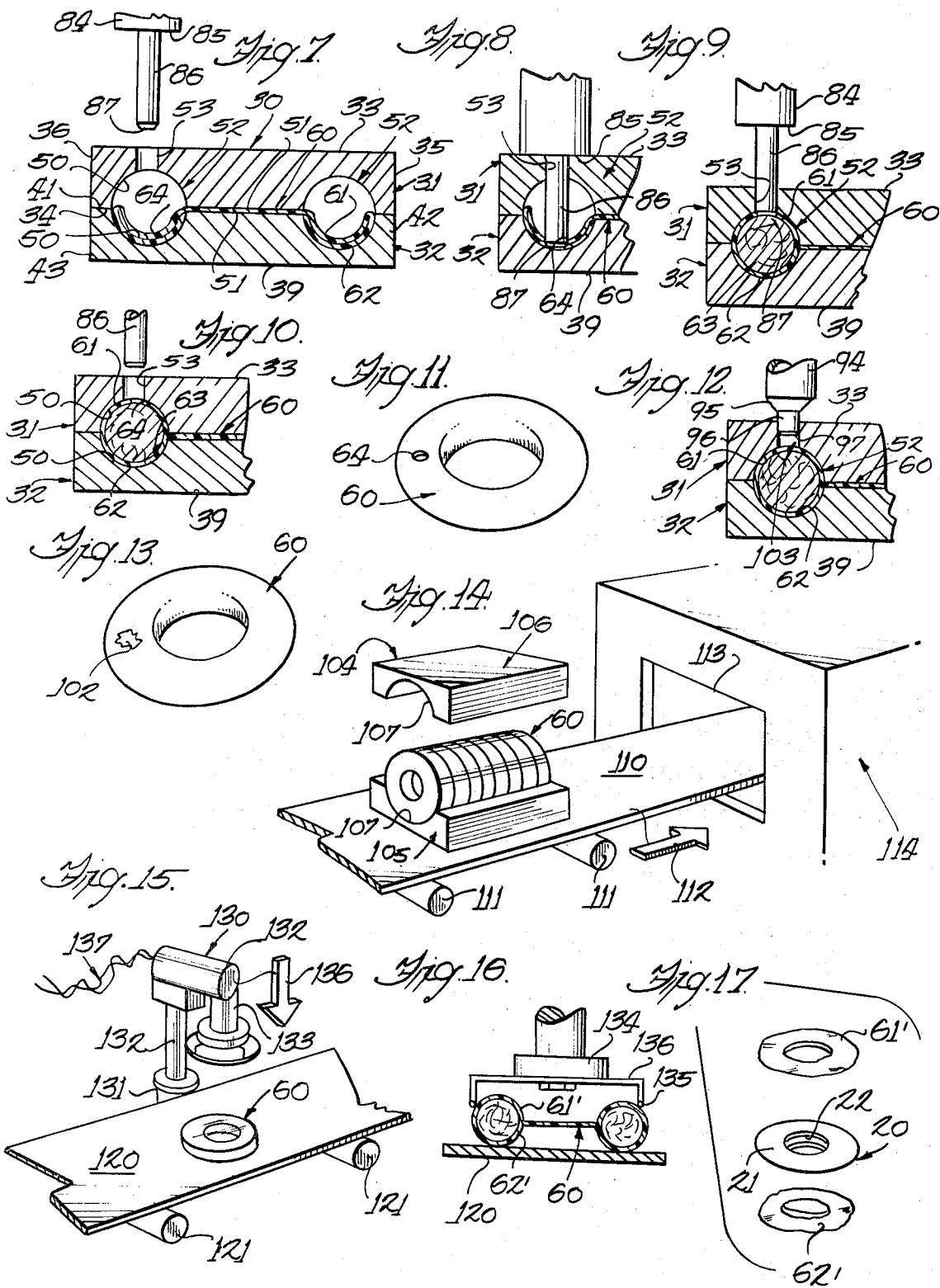

3,857,330

APPARATUS AND METHOD FOR MANUFACTURING A TOROID SHAPED HOT DOG

BACKGROUND OF THE INVENTION

1. Field of the Invention

This invention relates generally to the manufacturing of food products and more particularly to a novel apparatus for the manufacturing of a circular shaped hot dog.

2. Description of the Prior Art

There has long been known in the prior art to manufacture hot dogs of a cylindrical elongated shape due to the ease of such manufacturing as the casing of such hot dog is easily stuffed with the ends of the casing tied off to define the length of the hot dog, after which such casing is readily stripped from the hot dog prior to the packaging and selling of the same. However, while such hot dogs have become conventional in size and shape, they are inconvenient and oftentimes messy to eat after various condiments have been placed therealong as the condiments often seqeeze out of the sides or edges of the bun containing the hot dog when being eaten by an individual.

SUMMARY OF THE INVENTION

The present invention recognizes the conventional appearance and shape of presently available hot dogs and provides an apparatus and method for the manufacturing of a new shape of a hot dog providing the use of circular buns for eating the same, the hot dog being adapted for use as a novelty food at circuses, fairs, sporting events, and the like with the unique appearance of the hot dog arousing interest and amusement in individuals eating the same.

It is a feature of the present invention to provide a doughnut shaped hot dog wherein condiments and the like may be inserted in the opening centrally of the hot dog for ease of placement thereinto and for eating the same in conjunction with the eating of the hot dog.

A further feature of the present invention provides an apparatus for the manufacture of a novel shaped hot dog.

Still a further feature of the present invention provides for the method of the manufacture of a novel circularly shaped hot dog in the general form of a doughnut.

The provision of an apparatus and method for the manufacturing of a novel shaped hot dog, such as briefly outlined above, and possessing the stated features and advantages, constitutes the principal features and advantages of the present invention. It is to be understood, however, that other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a perspective view of a plurality of hot dogs manufactured in accordance with the method of the present invention and using the apparatus of the present invention with the hot dogs being packaged for shipping and storage;

FIG. 2 is a perspective view of a circular doughnut shaped hot dog in accord with the present invention;

FIG. 3 is a perspective view of the casing;

FIG. 4 is an exploded fragmentary perspective view of the mold;

FIG. 5 is a fragmentary perspective view of the apparatus for stuffing the hot dog and sealing the casing;

FIG. 6 is a cross-sectional view taken along Line 6—6 of FIG. 5;

FIG. 7 is a cross-sectional view taken along Line 7—7 of FIG. 5;

FIG. 8 is a fragmentary cross-sectional view similar to FIG. 7 and having the stuffing apparatus inserted into the mold in position to fill the casing;

FIG. 9 is a cross-sectional view similar to FIG. 8 and having the stuffing apparatus withdrawn from the mold recess with the casing being stuffed with the food product;

FIG. 10 is a cross-sectional view similar to FIG. 9 with the stuffing apparatus completely withdrawn from the mold;

FIG. 11 is a perspective view of the casing separate from the mold and filled with the food product;

FIG. 12 is a cross-sectional view taken along Line 12—12 of FIG. 5 and illustrating the sealing of the opening in the casing after the same has been stuffed with the food product;

FIG. 13 is a perspective view of the stuffed casing similar to FIG. 11 but having the opening sealed;

FIG. 14 is a fragmentary perspective view of a conveyor belt carrying a plurality of stuffed casings to an oven to be cooked;

FIG. 15 is a perspective view of a stripping apparatus adapted to sever the casing from the cooked food product;

FIG. 16 is a cross-sectional view taken along a plane intersecting the stripping apparatus and a circular hot dog disposed therebeneath with the casing severing device in engagement with the casing for severing the same; and FIG. 17 is an exploded perspective view of the severed casing being separated from the hot dog.

DESCRIPTION OF THE PREFERRED EMBODIMENT

Referring now to the drawings in detail there is seen in FIG. 2 a circular doughnut shaped hot dog 20 manufactured by the apparatus and procedure of the present invention and which constitutes an endless side wall 21 with an opening 22 disposed centrally of the hot dog for the placing of condiments or the like thereinto when the hot dog is placed in a circular bun (not shown) to be eaten by an individual.

As seen in FIG. 1, a plurality of hot dogs 20 are placed in juxtaposition with their openings 22 in axial alignment, and are vacuum sealed therein by a product conforming transparent cellophane or plastic bag 24 having a tear strip 25 extending therealong permitting the ease of removal of the bag from the hot dogs, the hot dogs being preferably hermetically packaged in the bag 24 with such package preferably holding eight hot dogs.

As best seen in FIGS. 4 and 5 a mold 30 is provided for the forming of the circular hot dogs 20, the mold being of an elongated rectangular shape having a top half 31 and a bottom half 32, the top half having a top surface 33, a bottom surface 34, and opposed side edges 35 and 36 with opposed end edges 37 and 38. The bottom section 32 has an outer surface 39, an inner surface 41, oposed side edges 42 and 43, and opposed end edges 44 and 45. Adjacent each end 44 and 45 of bottom section 32 is a cylindrical pin 47 having one end connected to the bottom section interior surface 31 with the opposite end projecting upwardly substantially normal thereto and adapted to be lockingly received in an aperture 48 extending through top section 31 in a position adjacent the reespective end surfaces 37 and 38, the pin 47 aligning and locking the mold top section 31 to the mold bottom section 32 with the respective interior surfaces 34 and 41 in engaging juxtaposition.

Formed in each of the interior surfaces 34 and 41 are a series of longitudinally spaced apart doughnut shaped recesses 50 each having a semi-circular cross-section with a boss member 51 disposed concentric therewith and extending upwardly from the bottom of the recess to terminate adjacent the respective interior surface such that the recesses 50 are of a ring shape. The recesses 50 in both the interior surfaces 34 and 41 cooperate with each other when the mold sections 31 and 32 are in juxtaposition so as to define a doughnut shaped recess 52 having a circular cross section. In addition, top section 31 is provided with a series of longitudinally aligned spaced apart openings 53 which extend therethrough between outer and interior surfaces 33 and 34 with each opening associated with a respective recess 50 to provide communication therewith.

A flattened circular casing 60 is provided and includes a top layer 61, a bottom layer 62, the layers being sealed together about their edges to form a single member defining a compartment 63 therebetween with an opening 64 extending through top layer 61 into the compartment 63. Each casing is aligned with recess 50 and then laid thereinto in a manner to drape over boss member 51 with the casing opening 64 in alignment with the associated opening 53 in the top most section 31. After the casings 60 are disposed in each of the mold recesses 50, the top section 31 is secured thereto such that the casings 60 are each disposed individually in the completed circular doughnut shaped recess 52 with the center portion of the casing squeezed together between opposed confronting top surfaces of the boss member 51, this being as seen in the drawings.

The mold 30 is then placed longitudinally on a moving belt type of powered conveyor 70 which is supported by rollers 71 spaced therealong with the bottom surface 39 of the mold engaging the top surface of the conveyor to rest the mold thereon. As the conveyor moves along in the direction as indicated by arrow 72 in FIG. 5, the mold moves progressively down the conveyor to pass first before a stuffing apparatus 80 and then beneath a sealing apparatus 90.

The stuffing apparatus 80 comprises a support hydraulically actuated cylinder 81 having a piston 82 projecting out of the top end thereof and mounted for reciprocal driven movement into and out of the cylinder 81, the piston having attached thereto a support member 83 which projects outwardly normal to the direction of the piston and is connected to a hollow tube 84 which projects downwardly therefrom in alignment with the progression of top section openings 53 progressing therebeneath, the bottom end 85 of the tube terminating in a nozzle 86 which projects axially downwardly therefrom to terminate in a tip 87, the nozzle being of a cylindrical configuration having a diameter slightly less than the diameter of the mold top section openings 53 with the energization of the hydraulic cyilnder 81 effecting the vertical reciprocal movement of the tube 84 and nozzle 86 relative to the mold 30 to effect the insertion of the nozzle 86 into an associated opening 53 until tip 87 is inserted into the casing opening 64 in the recess 52, this position being determined when the tube bottom end 85 engages the exterior surface 33 of mold top section 31. The cylinder 81 is connected by suitable flexible hydraulic conduits 88 to a suitable source of pressurized hydraulc fluid with the reciprocal movement of the plunger 82 relative to piston 81 being controlled by an individual 101 using suitable switches and controls disposed at a control station 100. The hollow tubing 84 has a compartment therein (not shown) in communication with the hollow nozzle 86 with the compartment being connected by a suitable flexible tubing 89 to a source of food product (not shown) and associated pressurized pumping mechanisms and controls on control station 100 to effect the directing of food product through the tubing and nozzle and into the compartment 63 of the casing 60.

As seen in the drawings, FIG. 6 shows the laying of the casing 60 in the recess 52, FIG. 7 shows the stuffing nozzle 86 in alignment with opening 53 prior to being inserted thereinto, FIG. 8 shows the stuffing position of the nozzle 86 inserted into the opening 53 with tube bottom surface 85 engaging exterior surface 33 to control penetration of the nozzle into the recess 52 and with the tip 87 of the nozzle in engagement with the casing opening 64, FIG. 9 shows the casing as stuffed with the nozzle 86 being withdrawn through opening 53 as the stuffing of the casing takes place by food product being delivered to the casing through the nozzle, and FIG. 10 shows the casing fully stuffed with the nozzle removed from the opening 53. As seen in FIG. 11 is a perspective view of the casing 60 as it would appear if it were removed from the mold 30 in the stuffed condition prior to the sealing of the opening 64.

After the casing 60 has been stuffed the conveyor belt 70 carries the mold 30 along until the opening 53 is disposed beneath the sealing apparatus 90 to effect the sealing of the opening 64 in the casing.

The sealing apparatus 90 comprises a double acting hydraulic cylinder 91 having a piston 92 projecting out of the top end thereof and mounted for reciprocal motion into and out of the cylinder, the top end of the piston having a bracket 93 having one end connected to the piston and projecting outwardly therefrom to overlie the conveyor belt 70, the opposite end of the bracket supporting a hollow tube 94 projecting downwardly therefrom and terminating in an inverted truncated conical surface 95 which in turn has connected thereto a hollow cylindrical nozzle 96 having a tip end 97. The tube 96 is of an elongated cylindrical configuration having a diameter adapted to be inserted into opening 53 with conical bottom end 95 of tube 94 adapted to engage exterior surface 33 to control the depth of penetration of the nozzle into the opening. The tube 94 is connected by a suitable flexible tubing 99 to a pressurized source of liquid sealant, such as liquid plastic, which is provided under pressure to the tubing 94 and interconnected nozzle 96 to spray a seal type patch 102 over the opening 64, such sealant spray being generally designated by reference numeral 103. The control of the sealant is managed by individual 101 at control station 100 by suitable switches and valves. Similarly, cylinder 91 is connected by a pair of suitable flexible hydraulic conduits 98 to a suitable source of pressurized hydraulic fluid which is controlled by the controls at control station 100 by the operating individual 101.

At the sealing apparatus 90, the nozzle 96 is axially inserted into opening 53 to spray a seal patch 102 onto the opening 64 of the casing 60 to seal the casing compartment 63 having the food product therein.

As seen in FIGS. 13 and 14, after all of the casings 60 for any particular mold 30 have been stuffed and sealed, the mold is removed from conveyor belt 70 as is opened by suitable handling apparatus and mechanisms in a conventional manner, with the stuffed and sealed casings 60 being removed from the recesses 52 and having a general appearance as seen in FIG. 13. The stuffed casings 60 are then disposed in a suitable container 104 wherein the casings are in juxtaposition with the openings 22 in substantial axial alignment, the container 104 having a bottom section 105 and a top section 106 with each section having a semi-circular recess 107 extending longitudinally therethrough, such recesses cooperating when the container is in the normal closed position to define a compartment of circular cross section extending therethrough, the diameter of the compartment being such to engage the outer peripheral surfaces of the filled casings 60 to secure the same therein. The container 104 is placed on moving belt type conveyor 110 which is supported on rollers 111 with the belt moving in the direction indicated by arrow 112 to carry the container 104 and the filled casings 60 disposed therein through an opening 113 and into an oven generally designated by reference numeral 114, the oven being of a suitable heat with the casings remaining therein for a suitable time to cook the food products in the casings. The oven 114 is preferably of the type having an open front end, such as by opening 113, and an open back end (not shown) with the conveyor belt 110 extending completely therethrough and the speed of the conveyor belt being such to assure the cooking of the food products in the casings 60 as the same pass therethrough, the containers 104 being removed from conveyor belt 110 at the opposite end of the oven after the same have passed therethrough to cook the hot dogs.

The cooked casings 60 are then removed from the container 104 and are placed in spaced apart longitudinally aligned relationship on a moving belt type conveyor 120 which is supported for movement on rollers 121, the casings being disposed flat onto the belt 120 with either casing layer 61 or 62 in engagement with the top surface of the conveyor belt. The casing 60 then pass beneath a stripping apparatus 130 adpated to operate in a manner to server the casing 60 to separate it from the hot dog 20. The stripping apparatus 130 comprises a hydraulically actuated cylinder 131 and a reciprocal piston rod 132 projecting out of the top end of the cylinder and reciprocal into and out of the same, the top end of the piston rod having a supporting member 32 projecting outwardly therefrom in a direction to overlie the conveyor belt 120 with the projecting end of the support member having connected thereto a shaft 133 which proejects downwardly therefrom in concentric axial alignment with each of the casings 60 as they progress therebeneath. The shaft 133 has mounted at the bottom end 134 thereof a high heat intensity nichrome type wire 135 supported on a circular wire frame 136 of a diameter less than the diameter of the casing 60 with the wire 135 defining a plane parallel to the plane of the casing passing therebeneath. The stripping apparatus is operable so as to lower the shaft 133 in the direction of arrow 136 to effect the engagement of wire 135 about the periphery of the casing 60 with electrical current being supplied to the wire 135 to sever the casing completely therealong into a top section 61' and a bottom section 62', after which the shaft 134 moves upwardly away from the casing 60 to permit the same to progress further on conveyor belt 120. The severing wire 135 is connected by suitable electrical wires 137 to a suitable source of electrical energy.

The now severed casing 60 is removed from the conveyor belt 120 in a conventional manner with the top and bottom casing sections 61' and 62' separated from the hot dog 20, after which the hot dog proceeds to conventional type packaging apparatus to package the same, such as in package 24 as seen in FIG. 1, for purposes of shipping and storage.

There is thus provided a novel apparatus and method for the preparation and manufacturing of a toroid circular doughnut-shaped hot dog.

It is to be understood that the form of this invention herewith shown and described is to be taken as a peferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. An apparatus for manufacturing a circular doughnut shaped hot dog comprising:

a flattened hollow circular casing having a top layer and an interconnected bottom layer, the top and bottom layers defining a compartment therebetween, and an opening disposed in the top layer communicating with the compartment;

a mold in the form of an elongated box-like member, the mold divided into a top half section and a bottom half section, the top half section having opposed interior and exterior surfaces, opposed side edges, and opposed end edges, the bottom half section having opposed interior and exterior surfaces, opposed side edges, and opposed end edges, the top and bottom half sections adapted to have their respective interior surfaces placed in engaging juxtaposition when the mold is assembled, means adapted for orienting and aligning the top section relative to the bottom section and for detachably securing said sections together, each interior surface of each top and bottom section having provided therealong a series of longitudinally aligned spaced apart recesses, each recess being generally ring-shaped and having a boss member projecting through the central portion thereof and terminating at a top surface co-planar with the associated section interior surface, each ring-shaped recess having a semi-circular cross-section, each recess in the interior bottom section cooperating with a substantially identically shaped recess in the interior top section surface to define therebetween when the mold is assembled a doughnut shaped recess having a circular cross-section, each recess adapted to receive therein a casing in a manner draping the casing over the boss member with the peripheral edges of the casing disposed in the recess, and a series of longitudinally aligned spaced apart apertures disposed in the top member and extending therethrough, each aperture in communication with an associated one of the top section recesses, and the casings when placed in the recesses having the casing openings disposed in axial alignment with the associated aperture in the mold top section;

a moving belt conveyor adapted to have the mold longitudinally aligned therewith and rested thereon to be carried therealong;

a stuffing apparatus mounted for reciprocating movement normal to the plane of the mold when resting on the conveyor belt, the stuffing apparatus including a hollow nozzle having a tip end and a top end and being of a diameter adapted to be axially inserted through a mold aperture to gain access to the mold recess with the tip end adapted to engage the casing opening in the mold recess, the top end of the hollow nozzle connected to the bottom end of a tubing having a diameter larger than the nozzle such that the bottom end of the tubing defines an annular shoulder about the nozzle, the tubing shoulder adapted to engage the exterior surface of the top section of the mold to limit the engagement of the nozzle in the mold recess, the tube housing having a hollow compartment defined therein which is in engagement with the hollow nozzle having a passageway formed therein, and a source of pressurized food product connected to the tubing and adapted to deliver food product into the tubing chamber and interconnected nozzle passageway for delivery into the casing in the recess when the nozzle tip is in engagement with the casing opening;

a sealing apparatus including a hollow nozzle having a tip end and an outer end with a cylindrical hollow body member interconnecting said ends, the nozzle member adapted to be axially inserted into a mold aperture to place the nozzle tip end in communication with the opening of the casing disposed in the assoicated recess, the nozzle having a passageway extending therethrough, and a source of pressurized sealant interconnected to the nozzzle and selectively deliverable thereto when the nozzle is in engagement with a mold aperture for the spraying of sealant thereout of onto the casing disposed therebeneath in a manner to form an integral patch on the casing to seal the casing opening;

an oven for the coooking of the casings and food products contained therein;

a transporting means for receiving the stuffed and sealed casings from the mold and transporting the same in a manner to be cooked to the oven;

a stripping apparatus operable to engage and sever the casing in a manner to permit separation of the casing from the cooked hot dog, the stripping apparatus including a shaft reciprocal in opposite directions and disposed axially with a stuffed and sealed cooked casing disposed therebeneath, the bottom end of the shaft having a circular frame support member mounted thereto, the frame being concentric with the stuffed casing disposed therebeneath, an electrically energizable heating wire disposed about the outermost peripheral ends of the frame in a manner defining a plane substantially parallel to the plane of the casing disposed therebeneath, the wire being disposed in a circular configuration on the frame with said circular configuration being of a diameter less than the diameter of the casing, the wire adapted to engage the peripheral edge surfaces of the casing upon being brought into engagement thereof by operation of the shaft, the wire severing the casing along the circular line of contact therewith to divide the casing into a top section and a bottom section to permit ease of separation of the casing from the hot dog;

carrying means adapted to receive the sealed casings and cooked hot dogs in a series of aligned spaced apart positions therealong to carry the same to the stripping apparatus and position the same relative to the stripping apparatus for proper engagement thereby of the severing wire; and means adapted to electrically interconnect the severing wire to a suitable source of electrical energy.

2. The apparatus as set forth in claim 1 wherein the means for aligning and securing the top and bottom sections of the mold comprises a pair of longitudinally spaced apart pin members, each pin member associated with one of the end edges of the bottom mold section and disposed adjacent thereto, each pin member having one end connected to the interior surface of the bottom section and projecting outwardly normal thereto, a pair of openings in the mold top section, each opening disposed adjacent one end edge of the top section in a position adapted to be engaged by the associated pin member with the respective recesses in each mold section are in axial alignment with each other, each pin member lockingly engaging its associated opening upon the interior surfaces of the top and bottom sections being placed juxtaposition with each other.

3. The apparatus as set forth in claim 2 wherein the sealing apparatus further comprises a hollow tubular housing member having a top end and a bottom end, sealant containing compartment disposed interiorly of the housing, the bottom end of the housing being in the form of an inverted truncated concial surface, the truncated apex of the conical surface being connected to the top end of the nozzle, the housing compartment being in communication with the nozzle passageway for delivery of sealant therethrough, and the conical surface of the housing bottom end adapted to engage the peripheral top edge of the mold opening at a position adjacent the mold top section exterior surface in a manner to limit the depth of penetration of the nozzle into the mold opening.

* * * * *